(12) United States Patent
Duncan

(10) Patent No.: US 7,619,021 B2
(45) Date of Patent: Nov. 17, 2009

(54) ADHESION PROMOTING COMPOUND

(75) Inventor: Robert Hume Duncan, Cleveland (GB)

(73) Assignee: Sun Chemical Corporation, Parsippany, NJ (US)

( * ) Notice: Subject to any disclaimer, the term of this patent is extended or adjusted under 35 U.S.C. 154(b) by 304 days.

(21) Appl. No.: 11/547,590

(22) PCT Filed: Mar. 17, 2005

(86) PCT No.: PCT/GB2005/000990

§ 371 (c)(1),
(2), (4) Date: Oct. 5, 2006

(87) PCT Pub. No.: WO2005/097919

PCT Pub. Date: Oct. 20, 2005

(65) Prior Publication Data

US 2008/0275178 A1    Nov. 6, 2008

(30) Foreign Application Priority Data

Apr. 5, 2004  (GB) ................. 0407701.2

(51) Int. Cl.
*C08K 5/04* (2006.01)
*C08K 3/10* (2006.01)
*C08K 3/16* (2006.01)

(52) U.S. Cl. .............. 524/413; 524/123; 524/126; 524/127; 524/130; 524/133; 524/140; 524/141; 524/398

(58) Field of Classification Search ............ 524/123, 524/126, 127, 130, 133, 140, 141, 413, 398
See application file for complete search history.

(56) References Cited

U.S. PATENT DOCUMENTS

| 4,659,848 A | 4/1987 | Kay et al. |
| 4,705,568 A | 11/1987 | Kay et al. |
| 5,973,036 A | 10/1999 | Matzinger et al. |
| 6,001,904 A | 12/1999 | Matzinger et al. |
| 6,007,610 A | 12/1999 | Matzinger et al. |
| 6,020,405 A | 2/2000 | Matzinger et al. |

FOREIGN PATENT DOCUMENTS

| EP | 0 376 284 A2 | 7/1990 |
| EP | 0 452 118 A1 | 10/1991 |
| GB | 2 161 811 A | 1/1986 |
| WO | WO-2004/053003 A1 | 6/2004 |

*Primary Examiner*—Peter Szekely
(74) *Attorney, Agent, or Firm*—Kramer Levin Naftalis & Frankel LLP

(57) ABSTRACT

The invention comprises an adhesion promoter for a printing ink and a printing ink comprising the adhesion promoter. The adhesion promoter comprises the product of (a) mixing together a solution of a polymer or synthetic resin with an organophosphorus compound, and then (b) mixing the mixture formed in (a) with a titanium compound selected from a titanium halide, alkoxide, halo-alkoxide or a condensed titanium alkoxide or a mixture of more than one of these titanium compounds.

17 Claims, No Drawings

ADHESION PROMOTING COMPOUND

This application is the U.S. National Phase application of PCT International Application No. PCT/GB2005/000990, filed Mar. 17, 2005, and claims priority of British Patent Application No. 0407701.2, filed Apr. 5, 2004.

FIELD OF THE INVENTION

The present invention relates to adhesion promoters, in particular for improving the adhesion of a printing ink to a substrate to which the ink is applied, and to printing ink formulations containing the adhesion promoters.

BACKGROUND OF THE INVENTION

Adhesion promoting compounds are used in commercial ink formulations in order to enhance the adhesion between the ink and the substrate onto which the ink is printed. Failure of adhesion leads to difficulties in the printing process or inadvertent removal of the print. Printing of plastics food packaging is widespread and it is particularly important in such applications that the printed ink remains on the packaging and that parts of the ink composition do not contaminate the product.

Adhesion promoters based upon titanium compounds have been known and used commercially for many years. Whilst providing good adhesion between the ink and substrate, simple titanium compounds such as titanium acetylacetonates have tended to impart undesirable yellow colour to the ink. GB-A-2161811 describes an adhesion promoter which is an organotitanate comprising the reaction product of a titanium orthoester and at least a monoalkyl phosphate (for example a mixture of a monoalkyl phosphate and a dialkyl phosphate) in which the alkyl group contains up to 6 carbon atoms and in which the total molar ratio P:Ti in the product is less than 2. Such compositions provide efficient adhesion promotion with much less yellowing than the afore-mentioned titanium compounds and have been successful commercially.

SUMMARY OF THE INVENTION

We have now found an adhesion promoter with improved properties.

According to the invention, we provide an adhesion promoter, suitable for use in printing ink formulations for promoting the adhesion of the printing ink to a substrate, comprising the product of (a) mixing a solution of a polymer or synthetic resin with an organophosphorus compound, and then
(b) mixing the mixture formed in (a) with a titanium compound selected from one or more of the group consisting of a titanium halide, titanium alkoxide, titanium haloalkoxide or a condensed titanium alkoxide.

According to a second aspect of the invention, we provide a printing ink comprising:

i) a polymeric binder, ii) a solvent for the polymeric binder, and iii) an adhesion promoter, for promoting the adhesion of the printing ink to a substrate, comprising the product of
(a) mixing a solution of a polymer or synthetic resin with an organophosphorus compound, and then
(b) mixing the mixture formed in (a) with a titanium compound selected from one or more of the group consisting of a titanium halide, titanium alkoxide, titanium haloalkoxide or a condensed titanium alkoxide.

According to a third aspect of the invention, we provide a method for manufacturing an adhesion promoting compound, comprising the steps of
(a) mixing a solution of a polymer or synthetic resin with an organophosphorus compound, and then
(b) mixing the mixture formed in (a) with a titanium compound selected from one or more of the group consisting of at titanium halide, titanium alkoxide, titanium haloalkoxide or a condensed titanium alkoxide.

DETAILED DESCRIPTION OF THE INVENTION

In this specification, the terms "adhesion promoter" and "adhesion promoting compound" have essentially the same meaning and may be used interchangeably.

The polymer or synthetic resin is preferably a hydroxyl-containing resin which is suitable for use in printing inks. Suitable hydroxyl-containing resins preferably have a hydroxyl number of from about 100 to about 500, especially from about 200 to about 400 mg KOH/g (tested according to DIN 53 240). Examples of suitable synthetic resins include ketone-aldehyde resins especially ketone-formaldehyde resins such as hydrogenated acetophenone formaldehyde condensation resins, cyclohexanone-formaldehyde condensation resins and urethane-modified ketone aldehyde resins. Such resins are available from Degussa AG as Synthetic Resins 1201, CA and SK, for example.

The polymer or synthetic resin is dissolved in a suitable solvent such as an alcohol or an ester, for example propyl acetate, ethyl acetate, ethanol or mixtures thereof. The solution preferably contains from about 10% to 70% of the resin (by weight), especially from 20% to 60% resin by weight. The amount of resin used depends upon its solubility in the solvent and the mobility of the final adhesion promoting compound.

The organophosphorus compound is preferably selected from a phosphate ester or a salt thereof comprising a dialkyl phosphate, a diaryl phosphate, a monoalkyl phosphate, a monoaryl phosphate or a mixture of two or more of a dialkyl phosphate, a diaryl phosphate, a monoalkyl phosphate and a mono aryl phosphate, a phosphonate ester or a salt thereof comprising an alkyl or aryl phosphonate or salts thereof, an alkyl or aryl pyrophosphate, an alkyl or aryl phosphonic acid or alkyl or aryl ester thereof or a salt thereof, a dialkyl or aryl phosphinic acid or salt thereof. In all cases the organophosphorus compound contains a P—OH group, i.e. an acidic group or its salt, i.e. a P—O$^-$M$^+$ group where M is metal or ammonium. Suitable salts are alkali metal, alkaline earth or ammonium (including alkyl ammonium) salts, e.g. Na$^+$ or NR$_4^+$ where R is H or alkyl. The preferred organophosphorus compounds have a reactive acid site, i.e. a P—OH group, although a salt may be preferred if the organophosphorus compound is highly acidic. The organophosphorus compound may be a mixture of more than one said compound. For clarity hereinafter, P—OH groups are referred to indicate the reactive group of the organophosphorus compound but this should not be taken to exclude the salts of P—OH groups.

The organophosphorus compound is preferably an alkyl phosphate compound which may be a mono- or a di-alkyl phosphate or is conveniently a mixture of mono- and dialkyl phosphates, such mixtures being more readily available than pure mono- or a di-alkyl phosphates. Monoalkyl phosphates generally have a formula (R$^1$O)PO(OH)$_2$. Dialkyl phosphates generally have the formula (R$^2$O)(R$^3$O)PO(OH). R$^1$, R$^2$ and R$^3$ each represents a linear or branched alkyl group usually containing up to 8 carbon atoms and preferably containing up to 5 carbon atoms. Usually, but not necessarily, $R^1$, $R^2$ and $R^3$ are identical. Preferably $R^1$, $R^2$ and $R^3$ are selected from n-butyl, sec-butyl, tert-butyl, iso-propyl, n-propyl, ethyl, methyl, phenyl, amyl and ethylhexyl.

The phosphonate ester, phosphonic acid, phosphinic acid or salt thereof comprises an alkyl or aryl phosphonate, phosphonic acid or their salts and generally have a formula $(R^4)_n PO(OR^5)_{2-n}(OH)$, where $R^4$ and $R^5$ each represent a hydrogen atom or an aryl group or an alkyl group containing up to 8 carbon atoms and preferably containing up to 5 carbon atoms and n is 1 or 2.

The titanium compound is a titanium halide, alkoxide, halo-alkoxide or a condensed titanium alkoxide or more than one of these compounds. Preferably the titanium compound is a titanium alkoxide having a general formula $Ti(OR)_4$ in which R is an alkyl group, preferably having from 1 to 8 carbon atoms. Each R group may be the same as or different from the other R groups. Particularly suitable alkoxides include tetraisopropoxy titanium, tetra-n-butoxy titanium and tetraethoxy titanium.

The condensed alkoxides are typically prepared by careful hydrolysis of titanium alkoxides and may be represented by the formula $R^6O[Ti(OR^6)_2O]R^6$ in which $R^6$ represents an alkyl group. Preferably, n is less than 20 and more preferably is less than 10. Preferably $R^6$ contains 1 to 6 carbon atoms and useful condensed alkoxides include the compounds known as polybutyl titanate and polyisopropyl titanate.

The amount of the resin solution, titanium compound and organophosphorus compound used to make the adhesion promoter depends to some extent upon the nature of the compounds selected. It is preferred that the amount of titanium compound and resin provide a mole ratio of OH:Ti in the range from 0.25:1-4:1, more preferably 0.5-2:1, where the OH content is the amount of OH derived from the resin component calculated on the basis of the hydroxyl value of the resin expressed as mg KOH/g.

The amount of organophosphorus compound and titanium compound used is preferably selected to provide a mole ratio of P—OH (and/or P—OM groups, where a salt is used) groups to Ti atoms in the range from 0.25-2:1 and is often in the region of 1-1.75:1. It is preferred that the amount of titanium compound and organophosphorus component used provide a mole ratio of P:Ti in the range from 10:1-0.5:1, but this may be varied to provide more or less P as required. The mole ratio of P:Ti may often lie in the range 0.5:1-2:1. Note that the moles of P atoms need not be the same as the number of moles of P—OH groups because an organophosphorus molecule may have between 1 and 3, normally between one and two free P—OH groups, as explained above. In the case of alkyl phosphate esters, for example, the commercial product which is usually a mixture of mono alkyl and dialkyl phosphates may contain some trialkylphosphate which has no P—OH groups and so does not bond to the titanium compound but which may nevertheless be present in the reaction mixture.

The adhesion promoter is made by mixing first the resin solution with the organophosphorus compound and mixing the resultant mixture with the titanium compound. It is preferred that the titanium compound is added to the mixture of resin solution and organophosphorus compound. It is also possible, but less preferred, to add the mixture of resin solution and organophosphorus compound to the titanium compound. The mixing of the resin solution with the organophosphorus compound may be accompanied by a visible colour change or an exotherm, indicating a reaction between the components of the mixture. The reaction of the resin/organophosphorus compound mixture with the titanium compound is usually exothermic and may also result in a thickening of the mixture. The exotherm may be controlled by cooling the reaction mixture and adding the titanium compound slowly and with care. Where thickening occurs, the addition of more of the titanium compound often results in reducing the viscosity of the mixture.

The adhesion promoter of the present invention may be useful in various coating compositions, e.g. for metal etc. but it is of particular use in flexographic and gravure inks containing a polymeric binder which is cross-linkable and is dissolved in an appropriate organic solvent. The printing inks of the invention are also typically of this type. Typical binders used in such inks are those based on nitrocellulose or ester type modified cellulose, e.g. cellulose acetate propionate. Often such polymeric binders are employed in mixed form with polyamides, polyurethanes or other resins. The ink also usually contains one or more pigments and/or one or more dyes. Typical pigments which can be used are the coloured inorganic pigments, white inorganic pigments and coloured organic pigments. Organic dyes can be used to render the ink an appropriate colour and often are used in conjunction with an opacifying white inorganic pigment such as titanium dioxide. The printing ink of the present invention need not necessarily include a pigment and/or a dye. Where no pigment or dye is present, the ink composition is often referred to as a varnish. Varnishes may be prepared for application in an unpigmented state to a substrate or they may be prepared for the later preparation of a coloured ink or coating by the addition of a pigment or dye, which may itself be dispersed as a concentrate or master batch in a quantity of a similar ink composition. The inks of the present invention can contain other additives such as slip aids and plasticisers.

The inks of the present invention usually contain the adhesion promoter in an amount of up to 10% by weight of the total weight of ink and preferably in an amount of 1 to 6% by weight of the ink. We have found that the adhesion promoters of the present invention are particularly effective and they may therefore be employed at lower concentrations than known adhesion promoters. Therefore in some applications the adhesion promoters are added to the ink in an amount of 1-3% of the total weight of the ink. When the adhesion promoter is used in a masterbatch composition, the concentration may be much greater, e.g. up to 20% but this would normally be diluted with other components of the ink before printing.

The inks of the present invention are of particular use in printing substrates formed of plastics materials, especially films, such as those used in packaging, especially food packaging. Examples of such substrates include polyester, polyethylene or co-extruded polypropylene/polyethylene film or sheets and polyvinylidene dichloride coated plastics material but this list is not intended to be limiting.

Ink Adhesion Test

The adhesion promoter compound to be tested was added to a $TiO_2$ base ink to give a mixture which contained 3% of the adhesion-promoting compound by weight. Ink drawdowns were made on a corona-discharge-treated polypropylene film using a number 2 K-bar. Films were dried by making four passes over a silica bar at 60° C. and then a tape adhesion test was made using 50 mm wide red opaque Scapa tape "Cellulose Splice Red Tape Type 1112". Results are determined by the percentage ink remaining in the test area after removal of the adhesive tape. Two inks to be compared are applied side-by-side to the same substrate film and a single strip of the adhesive tape is placed over both print samples together to ensure that the test conditions are identical. In this series of tests, one ink sample contained an adhesion promoter as noted in the Table whilst the other ink was a control, containing no adhesion promoter. The amount of ink of each type remaining on the substrate can then be compared directly.

Test Ink

A standard test ink is made using the following ingredients, given as parts by weight.

| Ingredient | Solution 1 | Solution 2 |
|---|---|---|
| Denatured alcohol | 62.6 | 75.2 |
| Ethyl acetate | 93.9 | 112.7 |
| Nitrocellulose DLX 3/5* | 57.4 | 68.9 |
| UNIREZ 710** | — | 10.0 |
| SK Resin*** | — | 25.1 |
| TiO₂ pigment | 365.4 | — |
| Solution 2 | 243.2 | |
| Polyurethane Resin**** | 177.5 | — |
| Total | 1000.0 | |

*from Nobel Enterprises
**from Union Camp Corp
***from Degussa AG
****Unithane ™ 671S from Cray Valley Ltd Prepare Solutions 1 and 2. Add the TiO$_2$ to Solution 1 and disperse. Add Solution 2 to the millbase and mix. Add the PU and mix. Filter and adjust to printing viscosity with 50:50 ethyl acetate/alcohol (approx. 25 s No. 2 Zahn cup). The adhesion promoter is added as the final component of the ink and mixed.

In all of the example compositions described, the phosphate esters used are commercial products supplied as mixtures of approximately 1:1 mole ratio of mono-alkyl and di-alkyl esters.

Example 1

A 50% (w/w) solution of "Synthetic Resin SK"™, available from Degussa AG and having a hydroxyl number of about 325 (according to the manufacturer's data sheet), was made up in n-propyl acetate. This solution will be referred to hereinafter as SK50 solution. To 87.7 g of the SK50 solution was added 50.7 g (0.25 moles) of amyl acid phosphate (approx 1:1 mono and di esters) with mixing. The solution changed from very pale yellow to orange. When all of the phosphate had been added to the resin solution and the solution had been mixing for 5 minutes, 71 g (0.25 moles) of tetra(isopropyl)titanate (VERTEC™ TIPT available from Johnson Matthey Catalysts) was added to the orange solution slowly with mixing. The mixture thickened on addition of the TIPT but became thinner as the addition progressed. When the addition was complete the product was mixed for a further 5 minutes and then transferred to an air-tight sample container. The sample product was then added to the Test ink formulation as given above, and then tested to assess the adhesion-promoting effect as described in the ink test, above. The results are shown in Table 1.

Examples 2-7

The adhesion promoter was made using the general method described in Example 1, but using the ingredients shown in Table 1.

In Example 3, only 43.5 g of SK resin solution were used instead of 87 g.

Synthetic Resin 1201™ from Degussa AG, which has a hydroxyl number of about 200 according to the manufacturer's data sheet, was used as a 50% (w/w) solution in Example 4 instead of the SK resin.

All of the adhesion promoter products were yellow-orange coloured.

Example 8

An adhesion promoter according to the invention was made using the general procedure described in example 1, except that the resin solution was made by dissolving 24.5 g of a commercial nitrocellulose resin (having a hydroxyl number of about 67) in a solvent mixture containing 42 g of an ethanol/ethyl acetate mixture (denatured alcohol known as TSDA) and 63 g of n-propyl acetate. The solution was orange-brown.

TABLE 1

| Adhesion promoter | Resin | Solvent | Organophosphorus compound | Ti compound | Test result (%) |
|---|---|---|---|---|---|
| none | | | | | 20 |
| Example 1 | SK50 | n-propyl acetate | Amyl acid phosphate | TIPT | 98 |
| Example 2* | SK50 | n-propyl acetate | isopropyl phosphate | TIPT | 98 |
| Example 3 | SK50 (43.5 g) | n-propyl acetate | Amyl acid phosphate | TIPT | 98 |
| Example 4 | 1201*** | Ethyl acetate | Amyl acid phosphate | TIPT | 95 |
| Example 5 | SK50 | n-propyl acetate | Amyl acid phosphate | Tetra(ethyl) titanate | 95 |
| Example 6 | SK50 | n-propyl acetate | Amyl acid phosphate | Tetra(n-butyl) titanate | 95 |
| Example 7** | SK50 | n-propyl acetate | Butyl acid phosphate | TIPT | 95 |
| Example 8 | N/C | TSDA + n-propyl acetate | Amyl acid phosphate | TIPT | 90 |
| VERTEC ™ PI2 | | | | | 95 |

Notes:
*Example 2 was a cloudy liquid.
**Example 7 was a clear liquid containing some solids.

Example 9

Testing of Inks Containing Adhesion Promoters of Examples 1-8

The test inks were made and tested according to the procedure given above. The results in Table 1 show the adhesion of ink containing the adhesion promoters of the invention at a level of 3% by weight. A comparative example using VERTEC PI2 adhesion promoter (which contains >8.5% by weight of titanium) at the same level of addition shows that the adhesion of the ink containing the adhesion promoters of the invention is at least as good as the adhesion of the ink containing the commercial adhesion promoter. However, the PI2 adhesion promoter has the disadvantage that the white test ink tends to become yellow and has some residual odour.

The colour of the printed test ink and a comparative ink containing either VERTEC PI2 or no adhesion promoter was measured using a calorimeter to determine the CieLab colour values. The results are shown in Table 2 which shows the a (red) and b (yellow) value measured for each sample. The results show that VERTEC PI2 causes an increase in green (-a) and yellow (b) compared with the ink with no additive. The ink made using the adhesion promoter of Example 1 shows virtually no effect on the measured colour.

TABLE 2

| Adhesion Promoter | a value | b value |
|---|---|---|
| None | −0.44 | 0.80 |
| VERTEC PI2 | −0.59 | 1.23 |
| Example 1 | −0.43 | 0.73 |

A further set of ink tests were run in which the adhesion promoter of Example 1 was used at a concentration of 3% and the commercial VERTEC PI2 comparison was added to the test ink at a level of 2%, i.e. in such quantities as to provide approximately the same amount of titanium in each ink. The results showed that the VERTEC PI2-promoted ink gave 80% adhesion, whilst the ink containing the adhesion promoter of the invention showed 98% adhesion.

The invention claimed is:

1. An adhesion promoter, suitable for use in printing ink formulations for promoting the adhesion of the printing ink to a substrate, comprising a composition comprising:
   (a) a titanium compound selected from one or more of the group consisting of titanium halide, titanium alkoxide, titanium halo-alkoxide and a condensed titanium alkoxide; and
   (b) a mixture comprising
      a solution of a polymer or synthetic resin mixed with an organophosphorus compound.

2. An adhesion promoter according to claim 1, wherein the organophosphorus compound is selected from the group consisting of a phosphate ester and a salt thereof, a phosphonate ester and a salt thereof, an alkyl or aryl pyrophosphate, an alkyl or aryl phosphonic acid or alkyl or aryl ester thereof and a salt thereof, a dialkyl or aryl phosphinic acid and a salt thereof and a mixture of more than one of the afore-mentioned compounds.

3. An adhesion promoter according to claim 2, wherein the organophosphorus compound is selected from the group consisting of a dialkyl phosphate, a diaryl phosphate, a monoalkyl phosphate, a mono-aryl phosphate and a mixture of two or more of a dialkyl phosphate, a diaryl phosphate, a monoalkyl phosphate and a mono-aryl phosphate.

4. An adhesion promoter according to claim 3, wherein the organophosphorus compound comprises a mono-alkyl phosphate, a di-alkyl phosphate, or a mixture of a mono- and dialkyl phosphates.

5. An adhesion promoter according to claim 4, wherein the organophosphorus compound comprises a monoalkyl phosphate having a formula $(R^1O)PO(OH)_2$ or a dialkyl phosphate having a formula $(R^2O)(R^3O)PO(OH)$, in which $R^1$, $R^2$ and $R^3$ each represents a linear or branched alkyl group usually containing up to 8 carbon atoms, or a mixture of said mono- and di-alkyl phosphates.

6. An adhesion promoter according to any of claims 1-5, wherein the resin is a synthetic hydroxyl-containing resin which is suitable for use in printing inks.

7. An adhesion promoter according to claim 6, wherein the hydroxyl-containing resin has a hydroxyl number of from about 100 to about 500 KOH/g (tested according to DIN 53 240).

8. An adhesion promoter according to claim 1, wherein the titanium compound is a titanium alkoxide having a general formula $Ti(OR)_4$ in which R is a alkyl group having from 1 to 8 carbon atoms and each R group is the same as or different from each other R group.

9. An adhesion promoter according to claim 1, wherein the amount of resin and titanium provide a mole ratio of OH:Ti in the range of 0.25:1 to 4:1, where the OH content is the amount of OH derived from the resin component calculated on the basis of the hydroxyl number of the resin expressed as mg KOH/g.

10. An adhesion promoter according to claim 1, wherein the amount of organophosphorus compound and titanium is selected to provide a mole ratio of P—OH and/or P—OM groups to Ti atoms in the range from 0.25:1 to 2:1.

11. An adhesion promoter according to claim 1, wherein the amount of organophosphorus component and titanium provide a mole ratio of P:Ti in the range of 10:1 to 0.5:1.

12. A printing ink comprising:
   i) at least one polymeric binder;
   ii) a solvent for the polymeric binder; and
   iii) an adhesion promoter according to claim 1.

13. A printing ink according to claim 12, further comprising a dye, a pigment or an opacifier.

14. A printing ink according to claim 12 or claim 13, wherein the adhesion promoter is present at a concentration of from 1 to 20% by weight, based upon the total weight of the ink.

15. A printing ink according to claim 14, wherein the adhesion promoter is present at a concentration of from 1 to 6% by weight, based upon the total weight of the ink.

16. A method for manufacturing an adhesion promoting compound comprising the steps of:
   (a) mixing a solution of a polymer or synthetic resin with an organophosphorus compound, and then
   (b) mixing the mixture formed in (a) with a titanium compound selected from one or more of the group consisting of a titanium halide, titanium alkoxide, titanium haloalkoxide and a condensed titanium alkoxide.

17. An adhesion promoter according to claim 7, wherein the hydroxyl-containing resin has a hydroxyl number of from about 200 to about 400 KOH/g (tested according to DIN 53 240).

* * * * *